(12) United States Patent
Yun et al.

(10) Patent No.: US 9,392,293 B2
(45) Date of Patent: Jul. 12, 2016

(54) ACCELERATED IMAGE PROCESSING

(71) Applicant: ALCATEL-LUCENT USA INC., Murray Hill, NJ (US)

(72) Inventors: Doohee Yun, Middletown, NJ (US); Hyunseok Chang, Holmdel, NJ (US); T. V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 122 days.

(21) Appl. No.: 14/283,549

(22) Filed: May 21, 2014

(65) Prior Publication Data
US 2015/0341647 A1    Nov. 26, 2015

(51) Int. Cl.
*G06K 9/36* (2006.01)
*H04N 19/176* (2014.01)
(Continued)

(52) U.S. Cl.
CPC ............ *H04N 19/176* (2014.11); *G06T 7/0044* (2013.01); *G06T 7/204* (2013.01); *H04N 5/91* (2013.01); *G06T 2207/10016* (2013.01); *G06T 2207/20021* (2013.01)

(58) Field of Classification Search
CPC .......... G06K 9/00711; G06K 9/00751; G06K 9/3216; H04N 1/41; H04N 5/147; H04N 5/23248; H04N 5/23254; H04N 5/23267; H04N 5/91; H04N 7/17336; H04N 13/0048; H04N 13/0059; H04N 19/05; H04N 19/07; H04N 19/112; H04N 19/137; H04N 19/16; H04N 19/176; H04N 19/186; H04N 19/20; H04N 19/42; H04N 19/46; H04N 19/51; H04N 19/517; H04N 19/521; H04N 19/523; H04N 19/56; H04N 19/563; H04N 19/577; H04N 19/583; H04N 19/587; H04N 19/593; H04N 19/597; H04N 19/61; H04N 19/63; H04N 19/85; H04N 19/86; H04N 19/895; H04N 21/21; H04N 21/23; H04N 21/2365; H04N 21/2383; H04N 21/4347; H04N 21/4387; G06T 1/00; G06T 7/0028; G06T 7/0081; G06T 7/20; G06T 7/2033; G06T 2207/0088; G06T 2207/30004; G06F 17/30784
See application file for complete search history.

(56) References Cited

U.S. PATENT DOCUMENTS 5,911,008 A * 6/1999 Niikura ............... G06K 9/00711
348/E5.067
6,005,980 A * 12/1999 Eifrig ................... H04N 19/563
375/E7.076

(Continued)

FOREIGN PATENT DOCUMENTS

EP          0952546       10/1999
WO       2011061709        5/2011

OTHER PUBLICATIONS

"Distinctive Image Features From Scale-Invariant Keypoints," David G. Lowe, Jan. 5, 2004, pp. 1-28.

(Continued)

*Primary Examiner* — Jose Couso
(74) *Attorney, Agent, or Firm* — Carlson, Gaskey & Olds, P.C.

(57) ABSTRACT

An illustrative example method of processing image data includes dividing a block of data into a plurality of sub-blocks, the block of data corresponding to at least one image; selecting at least one of the sub-blocks according to a predetermined sequence; identifying a plurality of features of interest in the selected sub-block; and processing the selected sub-block to provide information regarding at least one of the features of interest.

18 Claims, 2 Drawing Sheets

(51) Int. Cl.
   *H04N 5/91* (2006.01)
   *G06T 7/00* (2006.01)
   *G06T 7/20* (2006.01)

(56) References Cited

U.S. PATENT DOCUMENTS

| | | | | |
|---|---|---|---|---|
| 7,095,786 B1 * | 8/2006 | Schonfeld | ............ | G06T 7/2006 375/240.16 |
| 7,561,620 B2 * | 7/2009 | Winder | ............ | H04N 13/0011 348/700 |
| 7,953,284 B2 * | 5/2011 | Au | ............ | H04N 19/436 382/236 |
| 7,986,731 B2 * | 7/2011 | Haskell | ............ | H04N 19/172 375/240.03 |
| 8,098,733 B2 * | 1/2012 | Veremeev | ............ | G06T 7/2013 375/240.01 |
| 8,374,245 B2 * | 2/2013 | Tourapis | ............ | H04N 19/56 375/240.15 |
| 2007/0188491 A1 | 8/2007 | Denelsbeck et al. | | |

OTHER PUBLICATIONS

"The Computation of Optical Flow," S.S. Beauchemin and J.L. Barron, 1995, pp. 1-57.

Takacs, Gabriel et al. (2008). Outdoors augmented reality on mobile phone using loxel-based visual feature organization, Oct. 30-31, 2008, pp. 427-434, XP007915264, Vancouver, British Colombia, Canada.

The International Search Report and Written Opinion for PCT Application No. PCT/US2015/029584, mailed Sep. 7, 2015.

* cited by examiner

ACCELERATED IMAGE PROCESSING

BACKGROUND

There are a variety of situations in which processing image data is necessary or useful. One limitation on using image data is that typical processing techniques are computationally intensive, which tends to limit scenarios in which the image information may be used and the devices with which such image information may be used.

For example, it would be beneficial to use image data to facilitate a localization technique. Mobile station localization techniques are typically based on radio-frequency or telemetry information. Time and distance of arrival techniques are known for locating mobile stations using signals from cell towers, for example, however, such techniques may not provide sufficiently accurate location information for many situations. Some indoor localization is based on signal fingerprinting from Wi-Fi or Bluetooth access points that are already deployed in a building or location of interest. Such techniques, however, cannot achieve sub-meter accuracy for localization under most circumstances. Other techniques that have been proposed may provide better results than such techniques, however, they require specialized equipment and additional expense.

State of the art indoor localization techniques may be based upon image information, key point detection and matching. Such techniques usually require full-size image processing, which limits the ability to use such techniques with a variety of portable devices, such as mobile stations.

SUMMARY

An illustrative example method of processing image data includes dividing a block of data into a plurality of sub-blocks, the block of data corresponding to at least one image; selecting at least one of the sub-blocks according to a predetermined sequence; identifying a plurality of features of interest in the selected sub-block; and processing the selected sub-block to provide information regarding at least one of the features of interest.

In an example method having one or more features of the method of the previous paragraph, the at least one image comprises a plurality of video frames; the selected sub-block is a portion of one of the video frames; and the method comprises selecting a different sub-block from another one of the video frames according to the predetermined sequence; identifying a plurality of features of interest in the different sub-block; processing the different sub-block to provide information regarding at least one of the features of interest from the different sub-block; and performing the selecting, identifying and processing for a plurality of different sub-blocks from other respective ones of the video frames.

An example method having one or more features of the method of any of the previous paragraphs includes selecting the plurality of different sub-blocks in the predetermined sequence until an entire image area has been processed.

An example method having one or more features of the method of any of the previous paragraphs includes repeatedly performing the selecting, identifying and processing according to the predetermined sequence for subsequent pluralities of video frames.

An example method having one or more features of the method of any of the previous paragraphs includes selecting a different one of the sub-blocks according to the predetermined sequence; identifying a plurality of features of interest in the different one of the sub-blocks; and processing the different one of the sub-blocks to provide information regarding at least one of the features of interest in the different one of the sub-blocks.

An example method having one or more features of the method of any of the previous paragraphs includes selecting respective sub-blocks according to the predetermined sequence; and performing the identifying and the processing for the respective sub-blocks; wherein the block of data containing the selected sub-block comprises a first video frame in a sequence of video frames; and the respective sub-blocks are from respective blocks of data that respectively comprise another video frame in the sequence of video frames.

An example method having one or more features of the method of any of the previous paragraphs includes selecting respective portions of a set of sub-blocks that are adjacent to the selected sub-block; and including the selected portions with the selected sub-block when processing the first one of the sub-blocks.

In an example method having one or more features of the method of any of the previous paragraphs, the processing includes determining whether a position of at least the features of interest in the processed sub-block corresponds to a position of a corresponding feature in a reference image; and the processing provides information regarding a location of a source of the block of data relative to a location represented by the reference image.

In an example method having one or more features of the method of any of the previous paragraphs, the reference image corresponds to a map image of the location; and the source of the block of data comprises a camera associated with a mobile device.

In an example method having one or more features of the method of any of the previous paragraphs, the sub-blocks are arranged in a matrix having a plurality of rows and a plurality of columns, and the preselected sequence is different than a sequential movement across one of the rows or a sequential movement along one of the columns.

An illustrative example device for processing image data includes a processor that is configured to divide a block of data into a plurality of sub-blocks, the block of data corresponding to at least one image; select at least one of the sub-blocks according to a predetermined sequence; identify a plurality of features of interest in the selected sub-block; and process the selected sub-block to provide information regarding at least one of the features of interest.

In an example device having one or more features of the device of the previous paragraph, the at least one image comprises a plurality of video frames; the selected sub-block is a portion of one of the video frames; and the processor is configured to select a different sub-block from another one of the video frames according to the predetermined sequence; identify a plurality of features of interest in the different sub-block; process the different sub-block to provide information regarding at least one of the features of interest from the different sub-block; and perform the selecting, identifying and processing for a plurality of different sub-blocks from other respective ones of the video frames.

In an example device having one or more features of the device of either of the previous paragraphs, the processor is configured to select the plurality of different sub-blocks in the predetermined sequence until an entire image area has been processed.

In an example device having one or more features of the device of any of the previous paragraphs, the processor is configured to repeatedly perform the selecting, identifying and processing according to the predetermined sequence for subsequent pluralities of video frames.

In an example device having one or more features of the device of any of the previous paragraphs, the processor is configured to select a different one of the sub-blocks according to the predetermined sequence; identify a plurality of features of interest in the different one of the sub-blocks; and process the different one of the sub-blocks to provide information regarding at least one of the features of interest in the different one of the sub-blocks.

In an example device having one or more features of the device of any of the previous paragraphs, the processor is configured to select respective sub-blocks according to the predetermined sequence; and perform the identifying and the processing for the respective sub-blocks; wherein the block of data containing the selected sub-block comprises a first video frame in a sequence of video frames; and the respective sub-blocks are from respective blocks of data that respectively comprise another video frame in the sequence of video frames.

In an example device having one or more features of the device of any of the previous paragraphs, the processor is configured to select respective portions of a set of sub-blocks that are adjacent to the selected sub-block; and include the selected portions with the selected sub-block when processing the first one of the sub-blocks.

In an example device having one or more features of the device of any of the previous paragraphs, the processor is configured to determine whether a position of at least the features of interest in the processed sub-block corresponds to a position of a corresponding feature in a reference image; and wherein the processing provides information regarding a location of a source of the block of data relative to a location represented by the reference image.

In an example device having one or more features of the device of any of the previous paragraphs, the reference image corresponds to a map image of the location; and the source of the block of data comprises a camera associated with a mobile device.

In an example device having one or more features of the device of any of the previous paragraphs, the sub-blocks are arranged in a matrix having a plurality of rows and a plurality of columns, and the preselected sequence is different than a sequential movement across one of the rows or a sequential movement along one of the columns.

The various features and advantages of at least one disclosed embodiment will become apparent to those skilled in the art from the following detailed description. The drawings that accompany the detailed description can be briefly described as follows.

DETAILED DESCRIPTION

Figure 1:
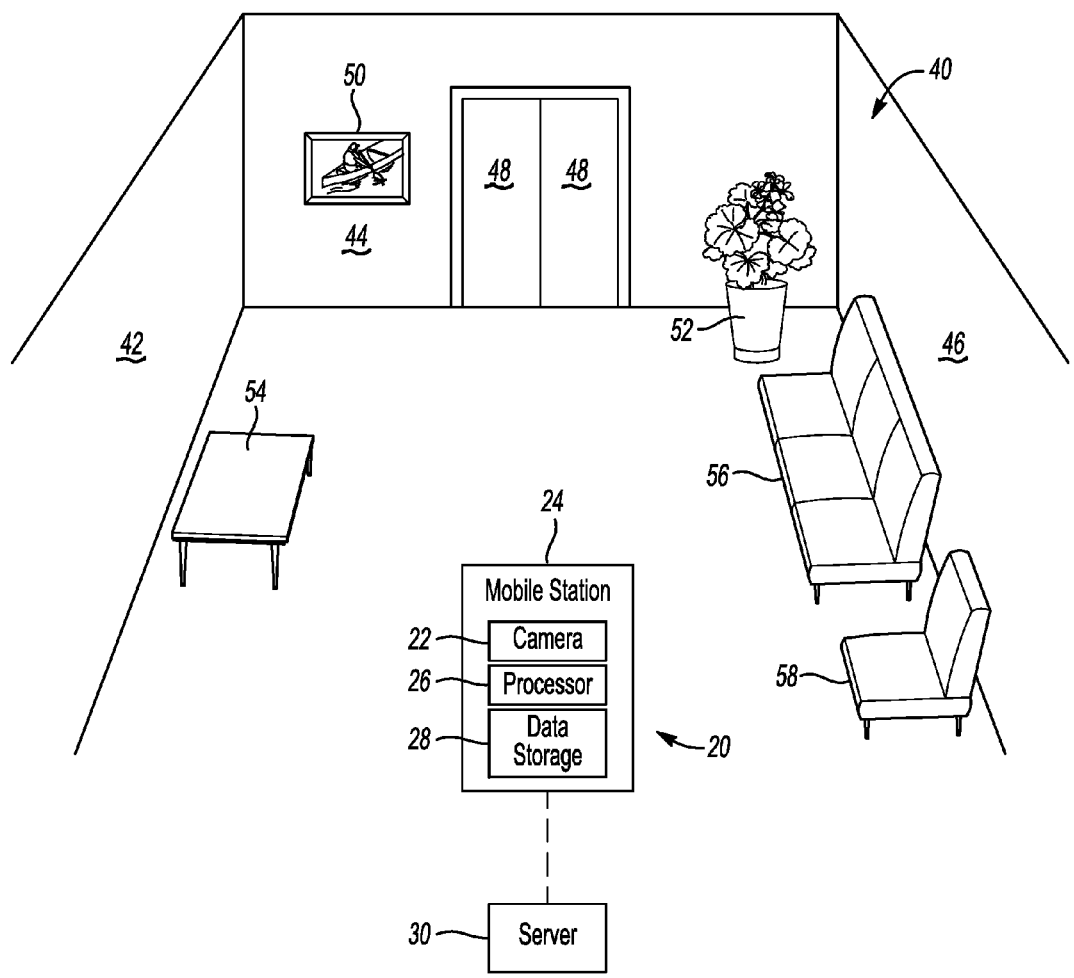
FIG. 1 schematically illustrates a mobile device designed according to an embodiment of this invention that is configured to process data corresponding to at least one image.

FIG. 1 schematically illustrates a device 20 for processing image data. A camera 22, which in this example is associated with a mobile station 24, captures at least one image. The mobile station may be a portable computing device, a smart phone or a visual device, such as Google GLASS™. The camera 22 may be configured to obtain still images or individual pictures, video or moving images, or both. The term "image" as used in this description should not be construed in a strict or limiting sense as it may encompass an image at a single instant in time, a motion picture, or video data, for example.

The mobile station 24 includes a processor 26 that is configured to process image information obtained from the camera 22. The processor 26 may be configured to process image information for a variety of purposes. For discussion purposes, the processor 26 is configured to process image information to facilitate localization, such as vision-based, three-dimensional indoor localization.

A data storage 28 is associated with and accessible by the processor 26 for image processing purposes. The data storage 28 may include reference image information, such as map image information regarding a variety of different locations, reference images regarding a variety of locations, and other information that may be useful to the processor 26 for purposes of completing the image processing required for a particular situation. The map or reference image may be obtained from a remote server 30 that communicates with the mobile station 24. The data storage 28 may retain map or reference image information on an as-needed basis or on a more permanent basis.

FIG. 1 schematically illustrates a location 40 within which the mobile station 24 is situated. The location 40 in this example is an indoor space enclosed at least by walls 42, 44 and 46. Doors 48 provide access between another area (not shown) and the location 40. A variety of items within the location 40 may provide reference points for identifying the position and orientation of the mobile station 24 within the location 40. A picture 50 situated on the wall 44, a plant 52 situated near the doors 48 and furniture items 54, 56 and 58 are example items within the location 40 that may appear in an image captured by the camera 22. Those items within an image may provide one or more features of interest that can be used by the processor 26 when processing the image data. Other possible features of interest that may serve as reference points include the edges of the doors 48 and the corners where the walls meet.

Given the typical size of an image file or the amount of data within a block of image data, the illustrated example includes a processing technique that allows for accommodating image information in an accurate and efficient manner within the processing power and power consumption limits on many mobile devices, such as smart phones.

Figure 2:
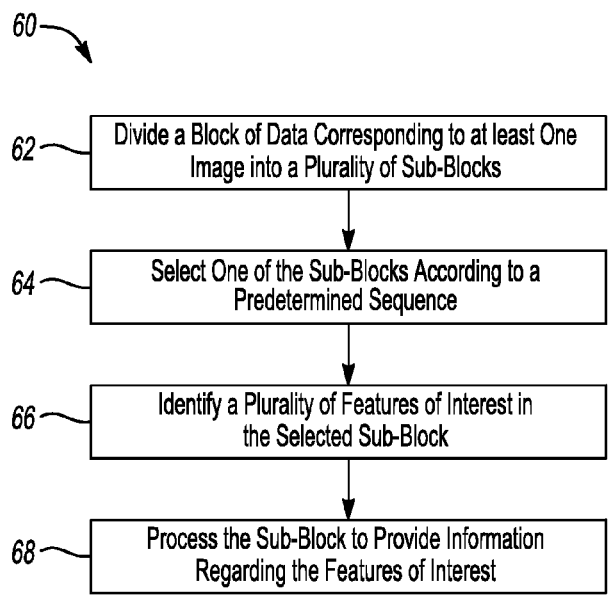
FIG. 2 is a flowchart diagram summarizing an example process designed according to an embodiment of this invention.

An example process is represented by the flowchart shown at 60 in FIG. 2. At 62, a block of data corresponding to at least one image is divided into a plurality of sub-blocks. At 64, one of the sub-blocks is selected according to a predetermined sequence. The predetermined sequence is configured to eventually cover an entire image area by selecting different sub-blocks in the sequence until the entire image area has been processed.

The example process includes identifying a plurality of features of interest within the selected sub-block at 66. The sub-block is then processed at 68 to provide information regarding at least one of the features of interest. By processing the sub-blocks in the predetermined sequence rather than processing the entire block of data at once, the illustrated example allows for accelerated image data processing and effectively reduces the computational load required at each processing frame or each processing period having a preselected time duration.

In some examples, the block of data corresponds to at least one video frame of a plurality of video frames sequentially obtained by the camera 22. In such examples, each video frame is processed using the technique shown in FIG. 2 so that the steps represented at 62-68 are performed for at least one sub-block from the respective video frames. The processing of each video frame may involve a different image area corresponding to a different sub-block compared to the other video frames. The predetermined sequence includes selected sub-blocks or image areas until the entire image area is covered or processed.

Figure 3:
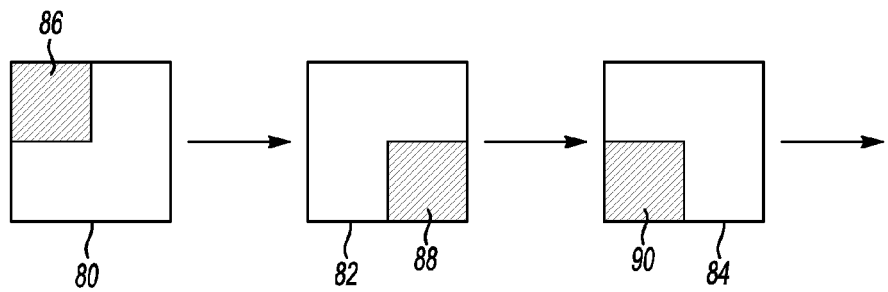
FIG. 3 schematically illustrates a technique for processing a plurality of sequential video frames according to an embodiment of this invention.

FIG. 3 schematically illustrates an example predetermined sequence for selecting sub-blocks from a respective plurality of video frames. A first video frame is shown at 80, a second video frame is shown at 82 and a third video frame is shown at 84. The processor 26 follows the predetermined sequence by selecting one of the sub-blocks shown at 86 from the first video frame 80, a different sub-block 88 from the second video frame 82 and another different sub-block 90 from the third video frame 84. The processor 26 identifies the features of interest within each sub-block and processes each sub-block before moving on to the next video frame. The selecting, identifying and processing all occur within the time period or frame of the respective video frames.

By following the preselected sequence, the processor 26 eventually covers or processes the entire image area of the image represented by the plurality of video frames. The illustrated video frames 80-84 represent a portion of the processing of the entire image area. The processor 26 is configured to complete the selecting, identifying and processing for the sub-blocks of the entire predetermined sequence and then to repeat the process represented in FIG. 2 by following the predetermined sequence again. For example, if there are four sub-blocks and the processor 26 processes one of the sub-blocks each frame, then the entire image area (or scene or screen) will be processed according to the predetermined sequence in four frames. The processor 26 follows the sequence again for the next four frames and the image processing continues in that manner until image processing is no longer needed.

Figure 4:
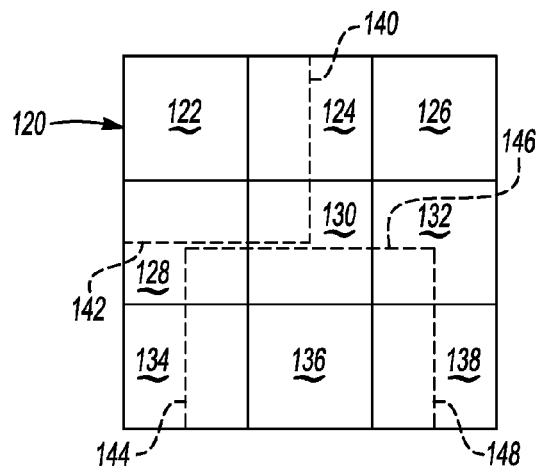
FIG. 4 schematically illustrates a feature for processing image data according to an embodiment of this invention.

FIG. 4 schematically illustrates a technique for including image information in the sub-block processing of the disclosed example embodiment. A block of data 120 corresponds to at least one image. The block of data 120 is divided into nine sub-blocks 122-138. The processor 26 processes the data within the block 120 by processing sub-blocks in a predetermined sequence, rather than processing the entire block 120 all at once. Given that there are nine sub-blocks distributed over the entire image area, the processor 26 processes a different one of the sub-blocks over nine frames to process the entire image.

The predetermined sequence of processing the sub-blocks may be considered a rotating sequence so that the entire image or entire block of data 120 is processed over time. Such a sequence is useful for compensating for difficulties associated with tracking features of interest or reference points within the image data that may result from changing images from the camera 22 as the mobile station 24 is moved into different positions within the location 40. For example, the sequence of processing sub-blocks in the example of FIG. 4 may be as follows: 122, 126, 130, 134, 138, 124, 128, 132, 136. As can be appreciated from the illustration, this example sequence does not go across one of the rows or along one of the columns in a straight sequence.

Using an evenly distributed processing sequence, such as that mentioned above, allows for accurate localization including tracked reference points (i.e., inliers) within the image data being distributed evenly across an entire image area (or screen). With the example sequence, a series of add-key point operations can be applied to the entire block of image data 120 (or image area) evenly over time.

While FIG. 4 shows nine sub-blocks, the number of sub-blocks may vary, depending on the needs or preferences for a particular situation. A matrix-style arrangement of sub-blocks including a plurality of rows and a plurality of columns may be arranged as a n×m matrix, where n and m may be a whole number value greater than or equal to two. The number and arrangement of the sub-blocks maintains an aspect ratio of the overall image in the illustrated example. The number of sub-blocks also dictates how many frames are required to process an entire image area in embodiments that include processing one sub-block per frame.

For indoor, three dimensional, vision-based localization, the technique summarized in the flowchart diagram 60 of FIG. 2 may include a variety of known key point detection and tracking algorithms. There are various proposals to apply image recognition to indoor navigation or localization and those skilled in the art who have the benefit of this description will realize what localization technique will be best for their particular situation.

For purposes of discussion, reference points or features of interest within an image will be considered as key points for purposes of determining a position and orientation of the mobile station 24 within the location 40. For example, a pre-established three dimensional indoor map of the location 40 may be based on a plurality of three dimensional key points extracted from images regarding the location 40. There are known techniques for generating such maps or map information and those skilled in the art who have the benefit of this description will understand what type of reference image or map information will best meet their particular needs. For example, the four corners of the picture 50, the frame of the doors 48 or the intersections of the walls 42 and 44 or 44 and 46 may be key points or features of interest within an image that are tracked for purpose of achieving the desired three dimensional localization.

Processing the image data to track and monitor the key points and determine their correspondence with key points in a previously generated map or reference image would be computationally expensive and burdensome if the entire block 120 of data were processed at the same time. Using the sub-blocks in a sequential manner reduces the computational complexity without sacrificing the number of key points that may be processed and monitored within the block of data 120.

One feature of processing the sub-blocks of image data includes determining whether a sub-block processing mode is appropriate. In one example, a first block of data is extracted from a video stream. The number of key points that are matched with corresponding points in a reference image or map is determined as a number of matched inliers in the frame or block of data. If the number of matched inliers does not exceed a predetermined threshold, image processing proceeds in full-image mode. Otherwise, processing may occur using the process 60 and the sub-blocks schematically shown in FIG. 4, for example. According to one example embodiment, the threshold number of matched inliers must be at least nineteen for the sub-block processing mode to be used by the processor 26.

One example includes using a known technique such as the random sample consensus (RANSAC) method for removing key point mismatches that are considered outliers. Based on two dimensional-three dimensional matches in the key points or features of interest, a six degree of freedom pose of the mobile station 24 is determined using a known technique. The inliers that correspond to sufficiently matched three dimensional key points from the reference image or map and two dimensional key points from the block of image data acquired by the camera 22 are assigned to a set of inliers that are tracked during the processing of image data. When the number of matched inliers exceeds the predetermined threshold, sub-block processing may continue.

While the sub-blocks are being processed in a predetermined sequence, one example includes using optical flow based inlier tracking applied to the entire image or block of data 120. A known optical flow technique that is not computationally expensive is used in one embodiment. Since the optical flow technique does not require as much processing capacity as identifying features of interest and processing the image data to provide information regarding those features of interest, the optical flow technique can be applied to the entire image rather than taking one sub-block at a time. The sub-blocks are used for new key point detection and add-key point operations while the entire block of data is used for tracking two-dimensional key point position.

According to one example embodiment, tracked inliers are propagated from previous inliers from a previously captured video frame or block of data. One example includes using a known optical flow technique that estimates two dimensional coordinates of the tracked inliers from the two dimensional coordinates of the corresponding, previously tracked inliers. The three dimensional coordinates of the key points or inliers in the three dimensional map or pre-established image remain fixed. Selecting the sub-blocks in a predetermined sequence allows for the sub-blocks to be processed one at a time using a sequence as described above, for example. The processing of each sub-block includes choosing new key points that are extracted from that sub-block. A determination is made whether to add key points to the currently tracked inliers. New key points may be matched against the three dimensional indoor map or pre-established image.

As the mobile station 24 moves within the location 40, it may approach the boundary of that location. Such movement will decrease the number of tracked inliers within the image captured by the camera 22. Under such circumstances, the pre-established reference image or map will be updated with new map data to cover a new location or territory. The need to make such an update may be determined by tracking the position of the mobile station 24 and accounting for the distance between the last update position of the map or reference image and a current position of the mobile station 24. Such a change in position may be monitored for every video frame or block of data 120. At an appropriate time, a map update may be triggered and selection of a new map may occur in a known manner.

Once the six degree of freedom pose of the mobile station 24 within a location is successfully determined, the image data is processed in the sub-block mode unless the number of tracked inliers falls below the predetermined threshold. As long as the number of tracked inliers is above the threshold, the sub-block mode may be used. Otherwise, image processing occurs using a full-image mode where the entire block of data 120 is processed at one time.

A sub-block mode reduces the computation time per video frame or processing instance without introducing degraded localization accuracy. The most time consuming computations in the sub-block mode may be the key point detection operation, which extracts key points from the image data, and the add-key point operation which matches extracted key points against the map or reference image. Each of these operations depends on the size of the image so dividing the block of data 120 into a plurality of sub-blocks allows for reducing the computation expense associated with each processing period or processing frame.

The number of sub-blocks selected may vary as described above. For example, the amount of time spent on key point detection and add-key point operations tends to decrease as the size of the sub-blocks decreases. While using smaller sub-block sizes reduces the overall per-frame computation time, it has a side effect. Using a smaller sub-block size increases the number of sub-blocks required to be processed to cover an entire video frame or image, which means that with a fixed frame processing rate, the video frame region ends up being scanned less frequently. Less frequent scanning may lead to a higher chance of losing tracked inliers and key point tracking errors may accumulate over time. Using a threshold as described above for allowing sub-block processing could cause a switch back to the more computationally heavy full-image mode on a more frequent basis if there are a higher number of lost tracked inliers. Given this description, those skilled in the art will be able to select an approximate number of sub-blocks to use for their particular situation.

If a key point extraction algorithm such as the known SIFT algorithm is used, it is possible that key points close to the edge of an image may not be detected. Using sub-blocks as schematically shown in FIG. 4 may result in losing key points along the boundaries between adjacent sub-blocks. The example of FIG. 4 accommodates this possibility by using overlapped regions of the sub-blocks. For example, the sub-block 122 is processed along with 50% of the adjacent sub-blocks 124 and 128 and 25% of the block 130. Other percentages may be used in other example embodiments. The amount of the video data that is processed when processing the sub-block 122 can be appreciated by considering the broken lines 140 and 142 in FIG. 4. The sub-blocks 124 and 128 each share a common edge with the sub-block 122. Including approximately 50% of each of those sub-blocks during the processing of the sub-block 122 avoids the loss of key points along the boundaries between those sub-frames.

The sub-block 136 is processed including approximately 50% of the sub-blocks 130, 134 and 138 such that the area of the block of data 120 that is processed when processing the sub-block 136 is within the boundaries shown by the broken lines 144, 146 and 148.

Using overlapping sub-block processing avoids the potential for losing key points along the borders of the sub-block of interest.

The disclosed example approach accelerates video data processing and allows for a relatively heavy computational load associated with image processing to be handled in a more efficient manner that does not sacrifice accuracy for purposes such as localization. The disclosed example approach may be useful for facilitating augmented reality applications, which may be useful with devices such as Google Glass. For example, an individual may have a visual display of a location to guide that individual to particular places within that location or to point out information of interest regarding different features within that location. The sub-block approach of processing the image data allows for a mobile station to provide meaningful and useful results from image processing without requiring the mobile station to process an entire block of image data all at once. Reducing the computational load in this way expands the ability for image processing using mobile devices.

Various features and aspects of the example method and device are described above. Embodiments of this invention may include less than all of the features described The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of processing image data comprising a plurality of video frames of at least one image, the method comprising:
    dividing a block of data into a plurality of sub-blocks, the block of data corresponding to a first one of the video frames of the at least one image, the plurality of sub-blocks respectively including only a portion of the block of data, wherein different ones of the plurality of sub-blocks correspond to different portions of the block of data;
    selecting at least one of the sub-blocks according to a predetermined sequence;
    identifying a plurality of features of interest only in the at least one selected sub-block;
    processing only the at least one selected sub-block to provide information regarding at least one of the features of interest;
    selecting a different sub-block from another one of the video frames according to the predetermined sequence;
    identifying a plurality of features of interest in the different sub-block;
    processing only the different sub-block to provide information regarding at least one of the features of interest from the different sub-block; and
    performing the selecting, identifying and processing for a plurality of different sub-blocks from other respective ones of the video frames.

2. The method of claim 1, comprising
    selecting the plurality of different sub-blocks in the predetermined sequence until an entire image area has been processed.

3. The method of claim 2, comprising
    repeatedly performing the selecting, identifying and processing according to the predetermined sequence for subsequent pluralities of video frames.

4. The method of claim 1, wherein the processing comprises
    selecting respective portions of a set of sub-blocks that are adjacent to the selected sub-block; and
    including the selected portions with the selected sub-block when processing the at least one selected sub-block.

5. The method of claim 1, wherein
    the processing includes determining whether a position of at least the features of interest in the processed at least one selected sub-block corresponds to a position of a corresponding feature in a reference image; and
    the processing provides information regarding a location of a source of the block of data relative to a location represented by the reference image.

6. The method of claim 5, wherein
    the reference image corresponds to a map image of the location; and
    the source of the block of data comprises a camera associated with a mobile device.

7. The method of claim 1, wherein
    the sub-blocks are arranged in a matrix having a plurality of rows and a plurality of columns; and
    the preselected sequence is different than a sequential movement across one of the rows or a sequential movement along one of the columns.

8. A device for processing image data comprising a plurality of video frames of at least one image, the device comprising:
    a processor that is configured to
    divide a block of data into a plurality of sub-blocks, the block of data corresponding to a first one of the video frames of the at least one image, the plurality of sub-blocks respectively including only a portion of the block of data, wherein different ones of the plurality of sub-blocks correspond to different portions of the block of data;
    select at least one of the sub-blocks according to a predetermined sequence;
    identify a plurality of features of interest only in the selected sub-block;
    process only the selected sub-block to provide information regarding at least one of the features of interest;
    select a different sub-block from another one of the video frames according to the predetermined sequence;
    identify a plurality of features of interest in the different sub-block;
    process only the different sub-block to provide information regarding at least one of the features of interest from the different sub-block; and
    wherein the processor is configured to use the predetermined sequence to select and process a plurality of different sub-blocks from other respective ones of the video frames.

9. The device of claim 8, wherein the processor is configured to
    select the plurality of different sub-blocks in the predetermined sequence until an entire image area has been processed.

10. The device of claim 9, wherein the processor is configured to
    repeatedly perform the selecting, identifying and processing according to the predetermined sequence for subsequent pluralities of video frames.

11. The device of claim 8, wherein the processor is configured to
    select respective portions of a set of sub-blocks that are adjacent to the selected sub-block; and
    include the selected portions with the selected sub-block when processing the selected sub-block.

12. The device of claim 8, wherein the processor is configured to
    determine whether a position of at least the features of interest in the processed sub-block corresponds to a position of a corresponding feature in a reference image; and
    wherein the processing provides information regarding a location of a source of the block of data relative to a location represented by the reference image.

13. The device of claim 12, wherein
    the reference image corresponds to a map image of the location; and
    the source of the block of data comprises a camera associated with a mobile device.

14. The device of claim 8, wherein
    the sub-blocks are arranged in a matrix having a plurality of rows and a plurality of columns; and
    the preselected sequence is different than a sequential movement across one of the rows or a sequential movement along one of the columns.

15. The device of claim 8, wherein the processor is configured to
   determine whether a sub-block processing mode is appropriate by:
      determining whether a number of key points in the at least one image correspond to points in a reference image;
      determining if the number exceeds a predetermined threshold; and
      using the sub-block processing if the number exceeds the predetermined threshold.

16. The device of claim 15, wherein the processor is configured to use a full-image processing mode if the number does not exceed the predetermined threshold.

17. The method of claim 1, comprising
   determining whether a number of key points in the at least one image correspond to points in a reference image;
   determining whether the number exceeds a predetermined threshold; and
   processing the at last one image using sub-block processing if the number exceeds the predetermined threshold.

18. The method of claim 17, comprising
   processing the at least one image in a full-image mode if the number does not exceed the predetermined threshold.

* * * * *